United States Patent Office 2,785,993
Patented Mar. 19, 1957

2,785,993

ALUMINUM SURFACE WITH PLURAL SUPERIMPOSED DIFFERENT RESINOUS COATINGS

Walter D. Paist, Berkeley Heights, and Francis J. Rielly, Chatham, N. J., assignors to Celanese Corporation of America, New York, N. Y., a corporation of Delaware No Drawing. Application January 28, 1955,
Serial No. 484,834

7 Claims. (Cl. 117—74)

This invention relates to coating and relates more particularly to the coating of a lower aliphatic acid ester of cellulose on aluminum.

It is desirable for certain applications to coat a layer of a lower fatty acid ester of cellulose, such as cellulose acetate, on aluminum. In this way it is possible to produce articles having a decorative appearance and to provide a cellulose acetate surface having a high dimensional stability. Such coatings of cellulose acetate on aluminum are especially valuable for use as printing plates. They are also useful in improving the toughness and durability of thin aluminum foil. Cellulose acetate, however, adheres poorly to aluminum so that it is necessary to provide between them a suitable bonding agent. A satisfactory bonding agent must not only produce a good bond between the cellulose acetate and the aluminum, but it must also be free from deleterious effects on either of these materials. Thus, it must not corrode or otherwise damage the aluminum surface. Furthermore, it must not affect the cellulose acetate in any way; accordingly, bonding agents containing plasticizers that tend to migrate into the cellulose acetate are not suitable for this purpose.

It is an important object of this invention to coat lower aliphatic acid esters of cellulose on aluminum in a way which will fulfill the foregoing and other requirements.

It is a further object of this invention to coat an aluminum surface with a lower aliphatic acid ester of cellulose, employing a composite structure including a layer of polyvinyl butyral adhering directly to the aluminum and a layer of a copolymer of maleic anhydride and an alkyl vinyl ether between the polyvinyl butyral and the cellulose ester.

Other objects of this invention will be apparent from the following detailed description and claims.

According to the present invention, lower aliphatic acid esters of cellulose, such as cellulose acetate, are bonded to aluminum by first coating the aluminum with polyvinyl butyral. To the coating of polyvinyl butyral so formed, there is applied a coating of a copolymer of maleic anhydride and an alkyl vinyl ether. Finally, the cellulose acetate is applied to the composite structure. The product obtained shows a strong adhesion between the cellulose acetate and the aluminum. Moreover, there are no undesirable effects on either the aluminum or the cellulose acetate. As a result, the cellulose acetate coated aluminum product is well suited for a wide variety of applications.

In carrying out this invention, there may be employed a flexible foil, a rigid sheet, or any other structure made of aluminum or having an aluminum surface. The aluminum surface to be coated should be clean and free from dirt, grease and other foreign substances. Onto this surface, there is applied a layer of polyvinyl butyral from a solution of the same in a suitable solvent. The polyvinyl butyral, which is normally prepared from polyvinyl acetate, should have a butyral content of between about 73 and 88% by weight calculated as polyvinyl butyral, a content of free hydroxyl groups of between about 10 and 25% by weight calculated as polyvinyl alcohol, and an acetate content of at most about 2.5% calculated as polyvinyl acetate. The polyvinyl butyral should have a viscosity of between about 8 and 90 centipoises, when measured as a 5% by weight solution in ethanol at 25° C. In applying the polyvinyl butyral, there may be employed a solution containing between about 5 and 25% by weight of the polyvinyl butyral dissolved in a suitable solvent, such as ethanol, methanol, isopropanol, methanol-toluene mixtures or dioxane. To increase the strength of the bond between the aluminum surface and the polyvinyl butyral, there may be incorporated into the coating solution between about 1 and 30% or preferably between about 1 and 10% by weight of phosphoric acid, based on the weight of the polyvinyl butyral. If desired, there may be incorporated into the polyvinyl butyral up to about 5% by weight based on the weight of the polyvinyl butyral of a curing agent to insolublize the polyvinyl butyral and permit the same to be set by heat. Examples of such curing agents include phenol formaldehyde and urea formaldehyde resins.

There is then applied to the polyvinyl butyral coating, a layer of a copolymer of maleic anhydride and an alkyl vinyl ether, specifically a copolymer of maleic anhydride and a lower alkyl vinyl ether such as methyl vinyl ether, ethyl vinyl ether or propyl vinyl ether. The copolymer should contain about equimolecular proportions of the two reactants. The degree of polymerization of the copolymer should be such as to give the polymer a specific viscosity of between about 0.09 and 2.5 when measured in an Ostwald viscometer at 25° C. on a solution of 1 gram of the polymer in 100 ml. of 2-butanone. Best results have been obtained where the polymer has a viscosity of between about 0.1 and 1.0. In applying the copolymer, there may be employed a solution containing between about 5 and 40% by weight of the copolymer dissolved in a suitable solvent such as acetone or 2-butanone. The thickness of the polymer coating is not critical, good results having been obtained with a coating of as little as about 0.2 mil or as much as about 1.0 mil. Once it has been applied to the polyvinyl butyral coating, the copolymer coating is dried, either at normal or at elevated temperatures.

Finally, there is applied to the copolymer coating, a layer of a lower aliphatic acid ester of cellulose, such as cellulose acetate, dissolved in a suitable solvent. In applying the cellulose acetate layer, there may be employed a solution containing between about 1 and 25% by weight of the cellulose acetate dissolved in a solvent such as acetone, 2-butanone, 2-methoxy ethyl acetate, dioxane or acetic acid. There may also be present in the solution between about 5 and 60% by weight of a suitable plasticizer or mixture of plasticizers for the cellulose acetate to improve the properties of the coating obtained. The cellulose acetate solution may also contain dyes, pigments, nacreous materials, fire retardants, ultra-violet light absorbents and other materials capable of modifying the appearance and properties of the final product. The thickness of the cellulose acetate coating may range from about 1 to 20 mils and the said coating may be applied in one or more successive layers. After it has been applied, the coating is dried, either at normal or at elevated temperatures.

If desired, cellulose acetate coatings of greater thickness may be applied by lamination of cellulose acetate plastic sheets ranging in thickness from about 10 to 125 mils. For example, the aluminum may be coated with the polyvinyl butyral and the copolymer of maleic anhydride and alkyl vinyl ether, followed by a thin coating of cellulose acetate as described above. Before the acetate coating dries and while it is still tacky, the cellulose acetate sheet of desired thickness is placed on the wet coating and rolled to obtain intimate contact between the surfaces. Good adhesion is obtained as the solvent is absorbed in the acetate sheet. As an alternate method the aluminum may be coated with the polyvinyl butyral and the cellulose acetate sheet coated with the copolymer of maleic anhydride and alkyl vinyl ether. After the coatings have dried, the surfaces are placed together and the layers laminated under heat and presure as is well understood in the art.

The product obtained in accordance with this invention, exhibits a good adhesion between the cellulose acetate coating and the aluminum surface. Depending upon the thickness of the aluminum material and the applied cellulose acetate coating, the product may be flexible or rigid. The cellulose acetate coating may have printing or other indicia applied thereto to alter its appearance. The cellulose acetate coating may be chemically modified, as by saponification or the like to alter its properties. Also, the cellulose acetate coating may act as a support for one or more additional layers of suitable material.

The process of this invention will now be described specifically in connection with the coating of an aluminum surface with cellulose acetate. It should be understood however, that in place of the cellulose acetate, there may be employed other lower aliphatic acid esters of cellulose including cellulose propionate, cellulose butyrate, cellulose acetate-propionate and cellulose acetate-butyrate.

The following examples are given to illustrate this invention further.

*Example I*

A one mil aluminum foil is coated with a solution containing dissolved in 95% ethanol, 10% by weight of a polyvinyl butyral having a butyral content of 76.2% by weight calculated as polyvinyl butyral, a free hyroxyl content of 22.7% by weight calculated as polyvinyl alcohol, an acetate content of 1.1% calculated as polyvinyl acetate, and a viscosity of 34 centipoises when measured at 25° C. as a 5% ethanol solution. The coating is dried for one hour at room temperature. The polyvinyl butyral coating is 0.5 mil thick. The coated foil is then coated with a solution containing, dissolved in acetone, 10% by weight of a copolymer of maleic anhydride and methyl vinyl ether, containing an equimolecular amount of the maleic anhydride and having a specific viscosity of 0.1 when measured as above. The coating is dried at room temperature for one hour. The second coating is 0.3 mil thick. The double coated foil is then coated with a solution containing, dissolved in a mixture of 95 parts by volume of acetone and 5 parts by volume of water, 20% by weight of a cellulose acetate composition, which composition includes 80% by weight of the cellulose acetate and 20% by weight of a plasticizer. The cellulose acetate coating is dried for 12 hours at room temperature to give a layer 2 mils thick. The finished product shows excellent adhesion between the cellulose acetate and the aluminum foil, both initially and after immersing the product in water for 20 minutes.

*Example II*

The process of Example I is repeated, adding to the polyvinyl butyral coating composition 1% by weight of phosphoric acid, based on the weight of the polyvinyl butyral. The finished product exhibits an even better adhesion between the aluminum foil and the cellulose acetate than is obtained in Example I.

It is to be understood that the foregoing detailed description is given merely by way of illustration and that many variations may be made therein without departing from the spirit of our invention.

Having described our invention what we desire to secure by Letters Pattent is:

1. An aluminum surface having thereon a first coating of polyvinyl butyral, a second coating of a copolymer of maleic anhydride and an alkyl vinyl ether, and a third coating of a lower aliphatic acid ester of cellulose.

2. An aluminum surface having thereon a first coating of polyvinyl butyral, a second coating of a copolymer of maleic anhydride and methyl vinyl ether, and a third coating of cellulose acetate.

3. An aluminum surface having thereon a first coating of polyvinyl butyral having a butyral content of between about 73 and 88% by weight calculated as polyvinyl butyral, a free hydroxyl content of between about 10 and 25% by weight calculated as polyvinyl alcohol and an acetate content of no more than about 2.5% by weight calculated as polyvinyl acetate, a second coating of a copolymer of equimolecular amounts of maleic anhydride and methyl vinyl ether, and a third coating of cellulose acetate.

4. Process which comprises applying to an aluminum surface a solution of polyvinyl butyral in a solvent, drying said layer, applying to the dry coating so formed a solution of a copolymer of maleic anhydride and an alkyl vinyl ether in a solvent, drying said layer, applying to the dry coating so formed a solution of a lower aliphatic acid ester of cellulose in a solvent, and drying said layer.

5. Process which comprises applying to an aluminum surface a solution of polyvinyl butyral in a volatile solvent, drying said layer, applying to the dry coating so formed a solution of a copolymer of maleic anhydride and methyl vinyl ether in a volatile solvent, drying said layer, applying to the dry coating so formed a solution of cellulose acetate in a volatile solvent, and drying said layer.

6. Process which comprises applying to an aluminum surface a solution of polyvinyl butyral and phosphoric acid in a volatile solvent, drying said layer, applying to the dry coating so formed a solution of copolymer of maleic anhydride and methyl vinyl ether in a volatile solvent, drying said layer, applying to the dry coating so formed a solution of cellulose acetate in a volatile solvent, and drying said layer.

7. Process which comprises applying to an aluminum surface a solution in a volatile solvent of polyvinyl butyral having a butyral content of between about 73 and 88% by weight calculated as polyvinyl butyral, a free hydroxyl content of between about 10 and 25% by weight calculated as polyvinyl alcohol and an acetate content of at most about 2.5% by weight calculated as polyvinyl acetate, drying said layer, applying to the dry coatings so formed a solution in a volatile solvent of a copolymer of equimolecular amounts of maleic anhydride and methyl vinyl ether, drying said layer, applying to the dry coating so formed a solution of cellulose acetate in a volatile solvent, and drying said layer.

References Cited in the file of this patent

UNITED STATES PATENTS

| | | |
|---|---|---|
| 2,299,433 | Stoner et al. | Oct. 20, 1942 |
| 2,326,955 | Mack et al. | Aug. 17, 1943 |
| 2,709,664 | Evans | May 31, 1955 |

OTHER REFERENCES

Organic Coating Technology, Payne, vol. I, pages 513, 518, 519, 520; published 1954.